Figure 1:
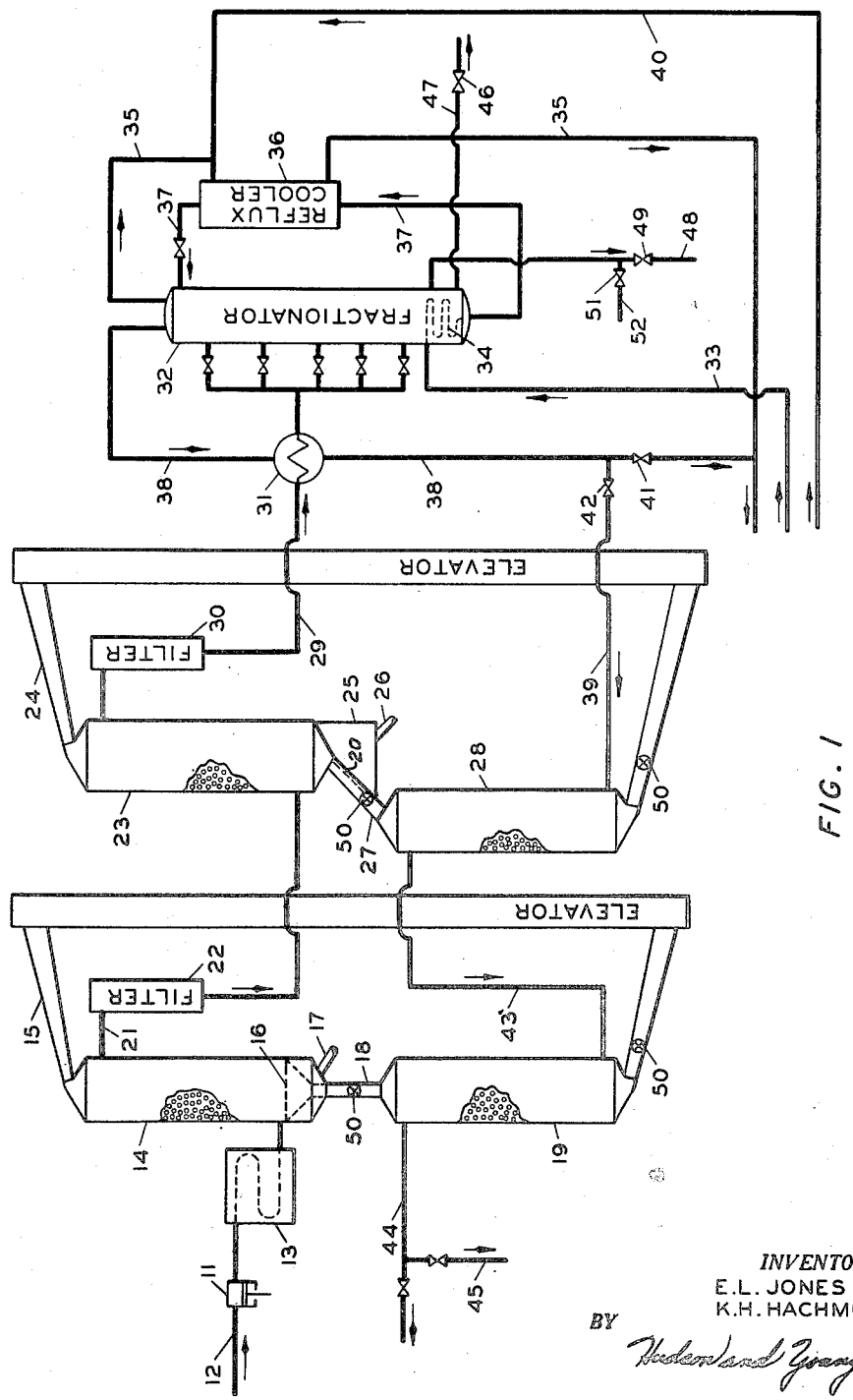

INVENTOR.
E.L. JONES
K.H. HACHMUTH
BY
ATTORNEYS

Patented Sept. 14, 1954

2,688,853

UNITED STATES PATENT OFFICE 2,688,853

PROCESS FOR REMOVING VAPORS FROM GASES

Karl H. Hachmuth, Bartlesville, and Edward L. Jones, Okmulgee, Okla., assignors to Phillips Petroleum Company, a corporation of Delaware Application November 22, 1948, Serial No. 61,442

7 Claims. (Cl. 62—122)

This invention relates to the production of relatively pure gaseous materials. In one of its more specific aspects, it relates to the continuous selective condensation of vapors from gases. In another of its more specific aspects, it relates to the production of oxygen.

The principles of vaporization and condensation have long been used as means for the separation of materials. When preparing gases for low-temperature separation, e. g., by fractionation, it is first necessary to remove certain impurities which are inherently present in practically all crude gases and which cause difficulties in the separation operation. Water and carbon dioxide form the greatest bulk of the impurities which hinder the efficient separation of the components of air. Various methods, including both high pressure and low pressure systems, have been devised and utilized for the removal of these impurities, but all these methods have generally required a substantially intermittent operation in the process and in most cases have resulted in considerable contamination of the product streams.

An object of this invention is to provide a method for selectively condensing vapors from gases. Another object is to provide an improved low pressure system for condensing vapors from gases. Another object of the invention is to provide an improved method for producing high purity oxygen. Another object of the invention is to provide an improved system comprising only continuous operations for the production of oxygen. Another object is to provide an improved system for the continuous condensation of vapors. Other and further objects and advantages will be apparent upon study of the accompanying disclosure and the drawing.

One of the gas separation processes which is most significant at present is the separation of the components of air. In order to remove the condensible impurities, such as water, carbon dioxide and various hydrocarbons, many processes have incorporated a separate chemical or physical absorption step. These require extra expense for equipment as well as for operation and, in the case of physical absorbents, require intermittent or cyclic operation in order to permit regeneration of the absorbent employed. Other processes remove the condensible impurities by lowering the temperature sufficiently to precipitate substantially all these impurities present. In this case cyclic flow reversals, or change-overs from one chamber to another, many times as frequently as every three minutes, are required to clean out the solids which have been precipitated. Even in the processes employing a separate absorption step, sufficient impurities carry over into the heat exchangers and settle out therein to require frequent reversals and even occasional shut-downs to permit cleaning out.

While these reversals usually entail only the switching of a valve or pair of valves, there are a number of undesirable results inherent in such reversals. For instance, each time a flow-reversal or a change-over of chambers takes place, a chamber full of the incoming gas stream is picked up in the product stream. This places a slug of impurity in the product or requires that this slug of product be wasted in order to keep the product pure. If a reversal is effected for the purpose of permitting the product stream to clean up precipitated solids, these evaporated solids which are picked up by the product stream as as impurities therein. Not only are the product streams thus affected but other undesirable effects are imposed on the operation of the process. For instance, when reversing a heat exchanger, the reversal of flow causes temperature variations and severe pressure pulsations within the system. These temperature and pressure variations act to unbalance the operation of fractionators, expanders, and temperature controls. Each time the operation of such equipment is unbalanced a readjustment of the system is required which imposes a loss of efficiency both in power and in separation. Accumulators have been incorporated into some processes, particularly immediately up-stream from the fractionator, in order to help smooth out temperature, pressure and flow variations incurred by the reversals or change-overs. Such accumulators, of course, demand extra space, expense of installation, and occasional maintenance expense.

In order to totally or in large measure remove the difficulties mentioned above, we have devised a method and a system to selectively condense vapors from gases in a continous manner so as to eliminate the reversals, change-overs and fluctuations of other known systems. This invention is particularly described herein with reference to the production of oxygen from air. The invention is, however, quite adaptable to the purification of natural gas wherein it is necessary to remove heavier hydrocarbons, water, carbon dioxide, and hydrogen sulfide from the gaseous material. The system is also adaptable, among other uses, to the recovery of ethylene from cracked gasolines and for the separation of ethane and ethylene.

Our invention utilizes pebble cooler apparatus in which heat transfer has been found to be especially efficient. In such pebble cooler apparatus a flowing mass of solid heat exchange material is injected into the upper portion of a first heat exchange chamber and moves downwardly therethrough as a flowing contiguous porous mass. The solid heat exchange material is withdrawn ordinarily through one or more constricted outlets in the bottom of the first chamber and is passed into the upper portion of a second heat exchange chamber, usually below the first, in which second chamber a flowing contiguous porous mass of solid heat exchange material is formed. The solid heat exchange material is withdrawn from the lower portion of the second heat exchange chamber through one or more constricted outlets and is elevated to the upper portion of the first heat exchange chamber and is injected thereinto through a solid material inlet in the upper portion of that chamber. Each of the heat exchange chambers is provided with a gaseous material inlet in its lower portion and with a gaseous material outlet in its upper portion.

Solid heat exchange material utilized in such pebble cooler apparatus is generally known as pebbles. The term "pebbles" as used herein is used to denote any substantially solid material of flowable size and form which has sufficient strength to withstand mechanical pressures and temperatures encountered within the pebble cooler apparatus and which has a relatively high specific heat. These pebbles must be of such structure that they can carry large amounts of heat from one chamber to another without rapid deterioration or substantial breakage. Pebbles which may be satisfactorily used in this pebble cooler apparatus may be substantially spherical in shape, and range from about one-eighth inch to about one inch in diameter. Better heat transfer is obtained, however, when pebbles having a diameter of between about one-fourth inch and about three-eighths inch are utilized. Materials which may be used singly or in combination in the formation of such pebbles include alumina, aluminum, nickel, cobalt, copper, iron magnesia, and zirconia. Pebbles formed of such materials serve very well in pebble coolers of the type utilized in this invention, but preference is given to pebbles composed of nickel-steel and nickel-copper alloys.

Figure 2:
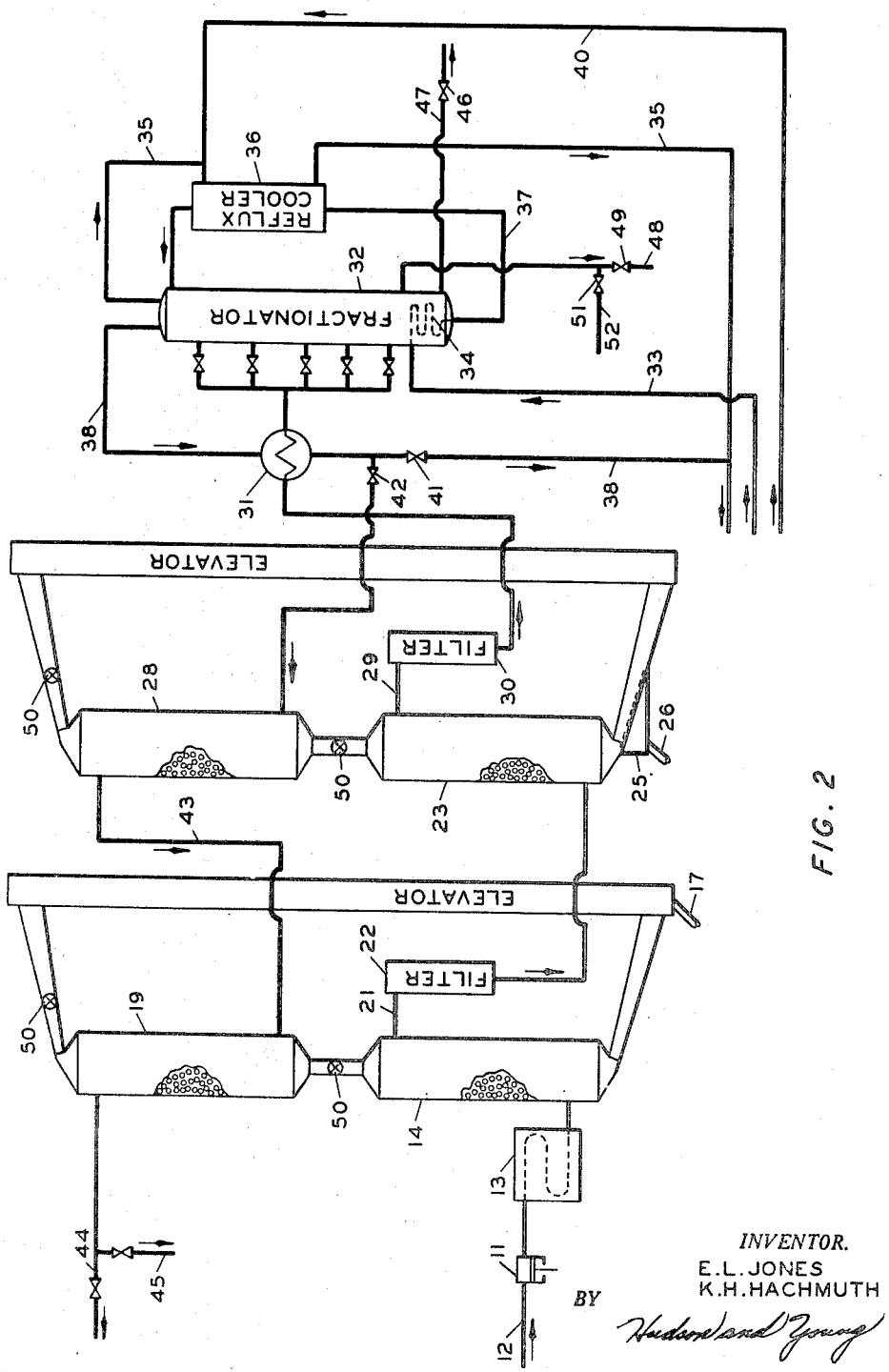

Understanding of the invention will be facilitated upon reference to the accompanying discussion and the drawings. In the drawings, Figure 1 is a diagrammatic representation of a preferred form of our invention. Figure 2 is a diagrammatic preferred modification of the invention.

In a low pressure process for the production of oxygen, as applied to the system diagrammatically set forth as Figure 1 of the drawing, air is drawn into compressor 11 through line 12 and is passed, by means of a continuation of line 12, through cooler 13 at a pressure ranging between about 2 p. s. i. g. and 10 p. s. i. g. The heat of compression in the air is removed and, if desired, additional cooling is applied in cooler 13 by the passage of a suitable cooling fluid through the cooler in indirect heat exchange relation. The air is removed from cooler 13 in a condition of substantially increased relative humidity, preferably saturated, and is passed, by means of a second continuation of line 12 into the lower portion of pebble cooler 14. A solid heat exchange material, at a temperature much lower than that of the injected air, is admitted into the upper portion of pebble cooler 14 through solid heat exchange material inlet conduit 15 in the upper portion of chamber 14. The solid heat exchange material forms a flowable contiguous porous mass within chamber 14 that moves downwardly therethrough countercurrent to the humid air flowing upwardly through chamber 14. As the humid air contacts the relatively cold solid heat exchange material, moisture is condensed from the air and flows downwardly in chamber 14 with the pebbles. A false bottom 16, provided within the lower portion of chamber 14, is so constructed as to allow the passage of condensed moisture through its walls but so as to prevent the passage of the solid heat exchange material therethrough. Condensed water is trapped between false bottom 16 and the bottom of chamber 14 and is withdrawn from chamber 14 through outlet conduit 17. As an alternative, condensed moisture may be removed by a device similar to that between chambers 23 and 28 as hereinafter described.

Solid heat exchange material, which has been substantially warmed in the heat exchange relation within chamber 14, is withdrawn from chamber 14 through throat 18 and is passed into the upper portion of pebble conditioner chamber 19 so as to form a flowable contiguous porous mass therein. Dehumidified air is removed from the upper portion of pebble cooler 14 through conduit 21 and is passed through filter 22 wherein entrained liquid or solid materials entrained in the air are filtered therefrom. The dehumidified air is passed, by means of extension of line 21, from filter 22 into the lower portion of pebble cooler 23. Solid heat exchange material which is relatively cold in relation to the dehumidified air injected into the lower portion of chamber 23 is admitted into the upper portion of chamber 23 through solid heat exchange material inlet conduit 24. The solid heat exchange material forms a flowable contiguous porous mass within chamber 23 and flows downwardly therethrough countercurrent to said dehumidified air which flows upwardly through chamber 23.

The solid heat exchange material which is injected into chamber 23 is at such temperature that carbon dioxide is precipitated from the dehumidified air by heat exchange between the air and the cold solid heat exchange material. The condensed carbon dioxide forms on the surface of the pebbles and flows downwardly through chamber 23 with the pebbles. Relative motion of the pebbles is ordinarily sufficient to break the greatest portion of solid carbon dioxide from the surface of the pebbles and the solid carbon dioxide particles are removed from the chamber 23 with the pebbles and are separated from the pebbles by means of separator 25. Separator 25 may be a chamber formed below a sloping solid-material conduit, the solid-material conduit having a perforate lower wall so as to allow the particles of solid carbon dioxide to fall therethrough but so as to prevent the passage of pebbles therethrough. Separation chamber 25, as is shown in the drawings, is a chamber which is disposed below throat 27. Throat 27 is provided with a perforate lower wall portion 20 as is diagrammatically disclosed by the dotted line in that portion of throat 27 which is contained within the upper portion of separator 25. Star valve 50 is utilized in throat 27, preferably at the lower end of the perforate throat portion 20, in order to maintain a difference in pressure between the upper and lower chambers as is disclosed hereinafter. Drain 26 extends from the chamber which forms a portion of separator 25. Because of the very excellent heat exchange inherent between pebbles and gases, the pebbles which are removed from the lower portion of pebble cooler chamber 23 are at nearly the same temperature as the dehumidified air injected into the lower portion of chamber 23.

For the normal concentration of carbon dioxide in the atmosphere, viz., about 0.04 per cent, precipitation does not occur above −215 to −220° F. for the operating pressure range of 2 to 10 p. s. i. g. In usual operation, the inlet air stream from conduit 21 to chamber 23 is kept just above this temperature range. By so operating no carbon dioxide load is imposed on filter 22 and the efficiency of chamber 23 is improved as hereinafter described. Precipitation occurs within chamber 23 at a level somewhat above the inlet. As the precipitated carbon dioxide moves downward it contacts slightly warmer air and re-sublimes, thus forming a carbon dioxide-rich layer of gas. Enrichment of this layer causes precipitation of carbon dioxide at higher temperatures and therefore at levels closer to the air-inlet level until initial precipitation becomes steady at about the level of the inlet. By this method all re-sublimation also occurs at this point. Because of the 1° F. to 5° F. temperature difference between the inlet air and the solid heat exchange material, some of the carbon dioxide will be carried downward on the surface of the heat exchange material as a solid, the remainder being gasified. Since gaseous carbon dioxide is heavier than air, it tends to form a carbon dioxide pocket within the lower portion of the chamber and will flow out of chamber 23 with the pebbles and form a pocket in separator 25. Thus, by maintaining the temperatures specified above, the turbulence of the re-sublimed carbon dioxide and its consequent re-mixing with the air are kept at a minimum, whereas if higher inlet temperatures are permitted, the layer of gaseous carbon dioxide through which the air passes will be thicker and more air will be entrained with the descending carbon dioxide. Gaseous carbon dioxide is removed through outlet conduit 26. A false bottom may be employed in the lower portion of chamber 23 and a carbon dioxide draw-off conduit may be inserted in the bottom of chamber 23 so that the gaseous carbon dioxide fraction from the chamber may also be drawn off at this point. The pebbles which have been warmed within chamber 23 pass through throat 27 into the upper portion of pebble conditioner chamber 28.

Purified cold air is removed from the upper portion of chamber 23 and is passed by means of line 29 through filter 30 in which solid particles of carbon dioxide are removed from the purified air stream. The purified air stream is then passed by means of a continuation of conduit 29 through heat exchanger 31 and into fractionator 32 at a point intermediate its ends. Exchanger 31 is designed to provide at least partial condensation of the air stream to fractionator 32 since such condensation is not permissible in pebble chamber 23. A sufficient number of plates is provided in fractionator 32 so that nearly pure nitrogen is passed overhead and nearly pure oxygen is passed from the reboiler.

Relatively high pressure gaseous nitrogen at just above its dew point is passed from an external compression system through conduit 33 and into coil 34 in the lower portion of fractionator 32 where it passes in indirect heat exchange relation with the liquid oxygen fraction in the reboiler. In the indirect heat exchange between the oxygen fraction and the nitrogen from the compression system, the oxygen fraction is boiled and the nitrogen is condensed. The nitrogen condensate is removed from coil 34 through conduit 37 and is passed in indirect heat exchange relation in reflux cooler 36 with a first portion of the overhead nitrogen fraction which is removed from fractionator 32 through conduit 35. The nitrogen condensate is then passed by means of a continuation of line 37 into the upper portion of fractionator 32 where it is flashed to provide nitrogen reflux and aid in the cooling. The portion of the overhead fraction which acts as the cooling agent in reflux cooler 36 is taken to the above-mentioned external compression system by means of continuation of line 35. A major portion of this nitrogen returns under considerable pressure from the compression system and goes to the reboiler coil 34 by way of conduit 33 to complete its compression cycle. The remaining portion is expanded and completes its compression cycle by returning through conduit 40 to reflux cooler 36 where it aids in cooling the reflux stream. The cooling to compensate for all heat leaks in the system is supplied by this external nitrogen compression cycle.

A second portion of the overhead nitrogen fraction is removed from the fractionator by way of conduit 38, is passed through heat exchanger 31 and then is divided into two streams. The smaller stream goes to conduit 35 as make up to the external compression system while the major stream goes through conduit 39 as coolant for the solid heat exchange material in chambers 28 and 19, respectively. Regulation of these two streams is accomplished by setting valves 41 and 42 to obtain the desired flow relationship. By regulating this make-up stream to the external compression system, a wide range in the amount of cooling for the fractionator is possible without varying the temperature differentials for which the system is designed, thus making possible a very flexible operation of the fractionator.

Because of the pressure drop through the system thus far described the nitrogen in conduit 38 is at a pressure several pounds lower than the pressure of the air entering chamber 14. In order to obtain successful operation of the pebble cooler apparatus under this difference in pressure between the upper and lower chambers it is essential that valves 50, for instance, star valves, be located in the pebble conduits beneath chambers 14, 19, 23 and 28, in order to minimize the leak of gaseous material between upper and lower chambers.

The nitrogen introduced into the lower portion of chamber 28 cools the solid heat exchange material therein sufficiently to accomplish the cooling of the incoming air that is required in chamber 23. Any carbon dioxide that is retained on the surface of the pebbles leaving chamber 23 is evaporated in chamber 28 by the nitrogen which passes therethrough since the nitrogen, before leaving chamber 28, is warmed by the pebbles to nearly the temperature of the air entering chamber 23. The nitrogen then passes by means of conduit 43 into the lower portion of chamber 19 where it acts as the cooling agent for the pebbles therein. In this chamber, the nitrogen picks up the small amount of moisture which has adhered to the surface of the pebbles and leaves the chamber within a few degrees of the temperature of the air entering chamber 14 and only very slightly contaminated by water, carbon dioxide or oxygen. Nitrogen from the upper portion of chamber 19 is passed by means of conduit 44 to the exterior of the cooler system. A portion of the nitrogen may be drawn off through conduit 45, returned to the compression system and recycled by way of fractionator 32 to chambers 28 and 19, respectively, in order to provide greater flexibility in the operation of the pebble cooler system.

If liquid oxygen is desired with the maximum purity available from the fractionator, valve 46 may be opened so as to pass the oxygen directly to a disposal point by way of conduit 47, thus wasting its cooling capacity. Gaseous oxygen of maximum purity may be obtained through conduit 48 by opening valve 49. The cooling capacity of this product stream may be recovered, in one modification, in the external compression system by passing it through valve 49 and conduit 48 in indirect heat-exchange relation with part of the high-pressure nitrogen being returned to reboiler coil 34.

A still higher degree of oxygen purity may be obtained by utilizing a low pressure stripping column, serially connected to the fractionator. An oxygen-rich liquid stream from the fractionator is fed to the upper portion of the stripping column. High pressure nitrogen provides heat for the stripping column. Nearly pure liquid oxygen is removed from the reboiler of the column. The overhead material from the stripper is combined with the gaseous oxygen-rich stream from the fractionator.

In those cases in which contamination of the product oxygen with very small amounts of water and carbon dioxide is not objectionable, valves 46 and 49 may be closed, valve 51 opened and the oxygen passed through conduit 52 to pebble conditioning chambers, not shown, similar to chambers 28 and 19, respectively, in a pebble cooler system similar to that which has been described above. Since in such a system the major portion of water and carbon dioxide present in the incoming air is removed by mechanical means such contamination is practically negligible and permits the production of oxygen with a purity much higher than in those systems which employ the product streams for total clean up.

Though the advantages of our invention when employed in the process arrangement schematically shown in Figure 1 are many, other and additional advantages may be realized when it is employed with an arrangement which is schematically shown in Figure 2 of the drawing, which is substantially the same process as that carried on as schematically shown in Figure 1 of the drawing. In the system of Figure 2, pebble coolers 14 and 23 form the lower set of chambers and pebble conditioner chambers 19 and 28 form the upper set of chambers. In this modification, separator 25 is provided in the solid material conduit extending from the lower portion of chamber 23 to the elevator means in the solid material conduit connecting the upper portion of chamber 28 and the lower portion of chamber 23. This modification has the decided advantage of shortening the path and time of travel of the pebbles while at their lowest temperature level. This greatly reduces the heat leak and/or insulation costs. This may especially be seen in the combination of chambers 14 and 19 when it is noted that the elevator for these chambers will be at the lowest temperature exhibited in these chambers in the system shown in Figure 1, but in the modification shown in Figure 2 it will be at substantially room temperature. Operating the elevator at room temperature also greatly reduces the mechanical difficulties of operation. False bottom 16 shown in chamber 14 of Figure 1 may also be eliminated and drain 17 placed at the lowest point in the elevator shaft, thus permitting the whole height of the shaft to be used for pebble drainage and a further reduction of the amount of moisture left on the pebbles to contaminate the product stream in chamber 19.

In the system disclosed herein, it is necessary only to maintain the air or gas feed under such a pressure as to overcome the pressure drop through the chambers of the system. That pressure drop will generally not exceed about five or six pounds.

This system may be modified by the incorporation of a double fractionator. In such a fractionator the partially liquefied air is introduced into the lower portion of the lower column at a pressure of at least 4½ atmospheres. In this column, as is well known in the art, oxygen-rich liquid air is withdrawn from the bottom of the lower column and expanded into the upper column as feed. Nitrogen in the top of the lower column and at the higher pressure of the lower column, acts as the heating medium for the reboiler of the upper column. The nitrogen is condensed thereby and is drawn off as liquid to be expanded, after suitable heat exchange, into the top of the upper column to provide reflux. High-purity, low pressure nitrogen is removed overhead from the upper column as a single stream. All of the overhead nitrogen is passed through reflux cooler 36 and then through condenser 31 before being divided into two streams, one going to the external compression system and the other going to pebble cooling chambers 28 and 19.

It is not necessary that the external compression system, which supplies all the cooling to compensate for heat leaks, operate on a nitrogen cycle. It may instead operate on an air cycle, particularly in connection with the double fractionator. The air is first purified in the pebble cooler system as in the preferred modification. Part of the gaseous air is drawn off to the compressors. This cold air to the compressors is passed in heat-exchange with the air returning from the compressors, in a manner similar to that of the nitrogen cycle, so as to reduce heat leak to a minimum. The air, however, does not act as a heating medium in the reboiler. It is instead expanded and introduced to an intermediate point in the upper fractionator. This method of operation lowers the purity of the products by one or two per cent, thereby canceling one of the advantages of the pebble cooler system. This modification is therefore mentioned only to illustrate that a number of modifications of the system described are possible within the scope of this invention.

The system may be further modified by passing a portion of the purified gas from fractionator 32 directly into the lower portion of each of the pebble conditioner chambers or any combination thereof and regulating the volume of gas flow therethrough so as to obtain the desired temperature within the pebble cooler chambers.

Argon, a valuable inert gas which is one of the components of air, may be obtained as a by-product of such an oxygen system. An argon-rich stream may be withdrawn from a point intermediate the ends of the fractionator inasmuch as the boiling point of the argon lies between nitrogen and oxygen. The argon may be recovered from the argon-rich stream.

We claim:

1. A method of separating condensible vapors from a gas and separating said gas into its final constituents which comprises the steps of passing a gas successively into the lower portions of at least one plurality of first heat exchange zones; admitting solid heat exchange material which is at a temperature below that of said gas into the upper portion of each said first heat exchange zone; passing said gas and said cold solid heat exchange material countercurrently through said first heat exchange zones so as to selectively condense vapors in said first heat exchange zones, said successive first heat exchange zones through which said gas is passed being maintained at successively lower temperatures; removing a portion of said condensed vapors from the lower portion of each said first heat exchange zone; passing said solid heat exchange material, which is substantially warmed in said first heat exchange zones, from the lower portion of each said first heat exchange zone into the upper portion of individual second heat exchange zones; passing said gas from the upper portion of the last heat exchange zone of said pluralities of first heat exchange zones through a low temperature fractionator zone so as to separate said gas into its final constituents; passing cold gaseous material from said fractionator zone upwardly through said second heat exchange zones communicating with said first heat exchange zones in heat exchange relation with said solid heat exchange material therein so as to maintain said second heat exchange zones at temperatures corresponding to the temperature of the first heat exchange zones with which they communicate; removing said gaseous material from the upper part of said second heat exchange zones; removing said solid heat exchange material from the lower portion of said second heat exchange zones; and passing said solid heat exchange material to the upper portion of said first heat exchange zones with which each said lower chamber communicates.

2. The method of claim 1, wherein a single gas fraction from said fractionator zone is passed successively through all of said second heat exchange zones.

3. The method of claim 1, wherein the gas removed from the upper portion of each said first heat exchange zone is filtered before passage through a succeeding first heat exchange zone.

4. A method of producing relatively pure oxygen which comprises the steps of passing pebbles into the upper portion of a first pebble cooler zone so as to form a contiguous fluid pebble bed therein; passing air which is at a temperature above that of said pebbles into the lower portion of said first pebble cooler zone and upwardly therethrough in heat exchange relation with said contiguous pebble bed so as to condense moisture from said air; removing a large portion of said condensed moisture from said pebbles and said first pebble cooler zone; withdrawing said pebbles from the lower portion of said first pebble cooler zone and passing said pebbles to the upper portion of a first pebble conditioner zone as a contiguous pebble bed therein, said pebbles having been warmed considerably in the heat exchange in said first pebble cooler zone; passing pebbles into the upper portion of a second pebble cooler zone as a contiguous fluid pebble bed therein at a temperature considerably lower than that of pebbles passed into said first pebble cooler zone; removing dehumidified air from the upper portion of said first pebble cooler zone and introducing said air into the lower portion of said second pebble cooler zone and upwardly through said pebble bed therein so as to condense carbon dioxide from said air by the heat exchange between said pebbles and said air; withdrawing said pebbles from the lower portion of said second pebble cooler zone; removing a large portion of said condensed carbon dioxide from said second pebble cooler zone and said pebbles; passing said pebbles from said second pebble cooler into the upper portion of a second pebble conditioner zone as a contiguous pebble bed therein; removing purified air from the upper portion of said second pebble cooler zone and passing said air to a low temperature fractionator zone; separating oxygen-rich and nitrogen-rich fractions in said fractionator zone; passing one of said fractions as a cold gas into the lower portion of said second pebble conditioner zone and upwardly through said pebble bed therein so as to cool said pebbles, and vaporize any portion of condensed carbon dioxide remaining with said pebbles in said second pebble conditioner zone; removing gaseous material from the upper portion of said second pebble conditioner zone; injecting said gas into the lower portion of said first pebble conditioner zone and upwardly through the pebble bed therein so as to cool said pebbles, and vaporize any portion of condensed moisture remaining with said pebbles in said first pebble conditioner zone; removing gaseous material from the upper portion of said first pebble conditioner zone; and withdrawing pebbles from the lower portions of said first and second pebble conditioner zones and passing said pebbles to the upper portion of their respective said pebble cooler zones.

5. A vapor condensation and gas separation system which comprises in combination two groups of substantially vertically disposed closed outer shells; a throat connecting the lower end of individual shells of one said group with the upper end of individual shells of the other group of shells; a solid material inlet conduit in the upper end of shells in the upper group of shells; a solid material outlet conduit in the lower end of shells in the lower group of shells; a contiguous mass of pebbles extending downwardly from the solid material inlet in the upper end of each pair of connected shells through said connecting throat and through said solid material outlet conduit in the lower end of each pair of connected shells; a gaseous material inlet in the lower portion of each shell in each group; a gaseous material outlet in the upper portion of each shell in each group; gaseous material conduits connecting said shells of said groups serially so that the gaseous material outlets of shells of each group are connected to the gaseous material inlet conduits of adjacent shells of the same group so that the gaseous material outlets of shells of one group of serially connected shells are adjacent the inlets of shells of said other group to which they are connected by said solid material conduits; a low temperature fractionator; a conduit connecting the gaseous material outlet of the last serially connected shell of one group with said fractionator at a point intermediate its ends; a conduit connecting one end portion of said fractionator with the gaseous material inlet conduit of the other group of serially connected shells; and elevation means connecting said solid material outlet conduits of shells in one of said groups of shells with said solid material inlet conduits of shells in the other group of shells, said shells so connected being also connected by said throats.

6. A vapor condensation and gas separation system which comprises in combination two groups of substantially vertically disposed closed outer shells; a throat connecting the lower end of individual shells of one said group with the upper end of individual shells of the other group of shells; a solid material inlet conduit in the upper end of shells in the upper group of shells; a solid material outlet conduit in the lower end of shells in the lower group of shells; a contiguous mass of pebbles extending downwardly from the solid material inlet in the upper end of each pair of connected shells through said connecting throat and through said solid material outlet conduit in the lower end of each pair of connected shells; a gaseous material inlet in the lower portion of each shell in each group; a gaseous material outlet in the upper portion of each shell in each group; gaseous material conduits connecting shells of one of said groups serially, gaseous material outlet to gaseous material inlet; a low temperature fractionator; a conduit connecting the gaseous material outlet of the last shell of said serially connected group with said fractionator at a point intermediate its ends; at least one conduit communicating between said fractionator and said gaseous material inlet conduits of said shells of said group otherwise unconnected with said fractionator; and elevation means connecting said solid material outlet conduits of shells in the lower of said groups of shells with said solid material inlet conduits of shells in the upper group of shells, said shells so connected being also connected by said throats.

7. A vapor condensation system which comprises in combination at least two closed pebble coolers therein; at least two closed pebble conditioners; a first communication means connecting the lower ends of individual pebble coolers with the upper end of individual pebble conditioners; a solid material inlet conduit in the upper end of each said pebble cooler; a solid material outlet conduit in the lower end of each said pebble conditioner; a contiguous mass of pebbles extending downwardly from the solid material inlet in the upper end of each pair of connected shells through said first communication means and through said solid material outlet conduit in the lower end of each pair of connected shells; a gaseous material inlet in the lower portion of each said cooler and conditioner; a gaseous material outlet in the upper portion of each said cooler and conditioner, said pebble coolers being serially connected, gaseous outlet to gaseous inlet, and said pebble conditioners being serially connected, gaseous outlet to gaseous inlet, so that the final gaseous outlet of said pebble coolers is adjacent the initial gaseous inlet of said pebble conditioners; a conduit connecting the initial gaseous inlet of said pebble conditioners with a gaseous cooling material supply source; a second communication means connecting the lower ends of individual pebble conditioners with the upper ends of individual pebble coolers; and elevation means in one of said communication means.

References Cited in the file of this patent

UNITED STATES PATENTS

| Number | Name | Date |
|---|---|---|
| 1,724,513 | Pollitzer | Aug. 13, 1929 |
| 2,141,997 | Linde et al. | Dec. 27, 1938 |
| 2,252,738 | Stoever | Aug. 18, 1941 |
| 2,516,717 | Ogorzaly | July 25, 1950 |
| 2,537,044 | Garbo | Jan. 9, 1951 |
| 2,560,469 | Ogorzaly | July 10, 1951 |

FOREIGN PATENTS

| Number | Country | Date |
|---|---|---|
| 525,197 | Great Britain | of 1940 |
| 685,490 | Germany | Dec. 19, 1939 |